United States Patent [19]

Buser

[11] Patent Number: 4,810,036
[45] Date of Patent: Mar. 7, 1989

[54] SHOULDER BELT RESTRAINT
[76] Inventor: Warren H. Buser, 670 Haihai St., Hilo, Hi. 96720
[21] Appl. No.: 127,834
[22] Filed: Dec. 2, 1987
[51] Int. Cl.[4] .............................................. A44C 5/18
[52] U.S. Cl. ................................... 297/464; 297/483; 24/265 AL
[58] Field of Search ............... 24/114.5, 265 AL, 198, 24/200; 297/483; 280/808

[56] References Cited
U.S. PATENT DOCUMENTS

| 1,848,313 | 3/1932 | Buresh | 297/483 X |
| 3,065,513 | 11/1962 | Warner et al. | |
| 3,222,688 | 12/1965 | Rozenzweig | 24/200 X |
| 3,324,560 | 6/1967 | Snyder | |
| 3,392,932 | 7/1968 | Kelsay | |
| 3,531,060 | 9/1970 | Foster | 24/114.5 |
| 3,695,697 | 10/1972 | Stoffel | 297/483 X |
| 3,696,474 | 10/1972 | Slauta | |
| 3,914,831 | 10/1975 | Steinberg | 24/265 AL |
| 3,929,351 | 12/1975 | Fricko | 297/483 X |
| 4,041,580 | 8/1977 | Turner et al. | 24/265 AL |
| 4,101,170 | 7/1978 | Mori et al. | 24/114.5 X |
| 4,371,192 | 2/1983 | Alix | 280/808 X |

FOREIGN PATENT DOCUMENTS 2805588 8/1979 Fed. Rep. of Germany .
644273 7/1984 Switzerland .

Primary Examiner—Peter A. Aschenbrenner
Attorney, Agent, or Firm—Robert W. Beach; Ward Brown

[57] ABSTRACT

The stop where the shoulder belt restraint is composed of four parallel, coplanar, cylindrical rods bridging between side plates. Each end of each rod is connected to a side plate by a tongue joint including a bellied split tongue snap fitted into a socket. The webbing of the restraint passes sinuously through the stop rods having at least two convolutions under one rod and over the adjacent rod.

4 Claims, 2 Drawing Sheets

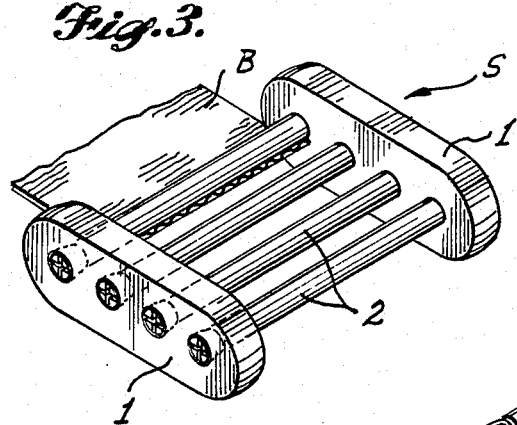
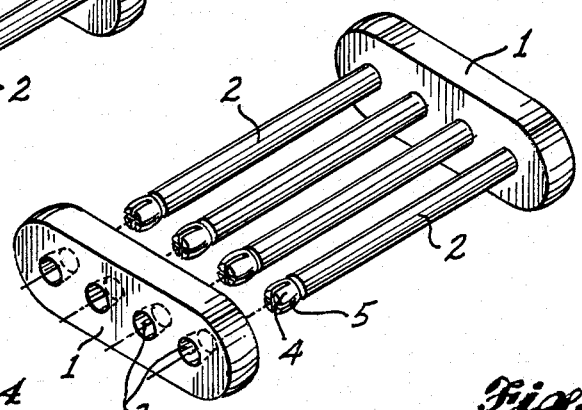
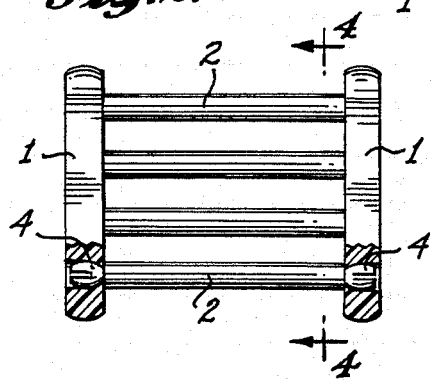
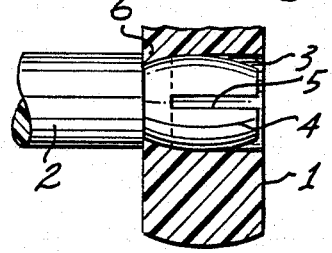
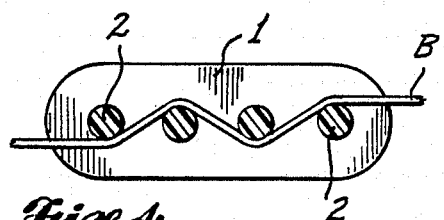
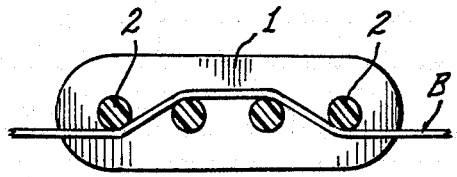
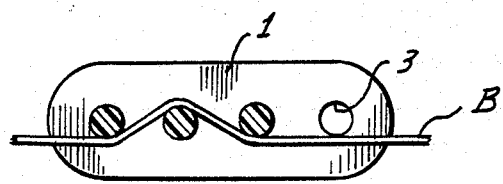

SHOULDER BELT RESTRAINT

BACKGROUND OF THE INVENTION

1. Field of the Invention

This invention relates to shoulder belt restraints and particularly to a stop utilized in such a restraint to limit travel of a restraint belt.

2. Problem

Restraints, particularly for use in vehicles, and especially automobiles, are provided, and may be required by law, to restrain movement of the passenger relative to the vehicle resulting from momentum of the passenger when movement of the vehicle is stopped abruptly in an accident. Restraints of the shoulder belt type include spring means that tension the shoulder belt extending diagonally across the user's chest which frequently is irritating and may be uncomfortable.

The problem addressed by the present invention is to relieve the tension in the shoulder belt when in use so as to eliminate annoyance and discomfort of the user without impairing the effectiveness of the restraint to restrain movement of the user relative to the vehicle in case of accident.

3. Prior Art

U.S. Pat. No. 3,392,932, issued July 16, 1968, discloses a loop and interengageable lugs for limiting travel of a seat belt, but such lugs are carried by a plate 29 bolted to the seat belt so that the position of the stop mechanism along the seat belt cannot be altered readily.

Swiss Pat. No. 644 273, dated July 31, 1984, shows a stop for a seat belt that is secured to the belt by a toothed lever which bites into the belt that must be released in order to adjust the position of the stop along the belt.

German Offenlegungsschrift No. 28 05 588, dated Aug. 16, 1979, shows a stop for a seat belt in the form of a clamp band that grips one edge of the seat belt when the band is closed, but such a band could be difficult to open and may not grip the belt edge reliably. When the clamp is unlatched, it can be removed from the seat belt and would be subject to being lost carelessly.

U.S. Pat. No. 3,324,560, issued June 13, 1967, discloses a stop clamp for a measuring tape that is somewhat comparable in construction to the stop shown in the German Offenlegungsschrift No. 28 05 588 and probably could be used for the same purpose. It may, however, be difficult to latch or unlatch such clamp and the clamp may not be too reliable. Also, when such clamp is unlatched, it can be removed easily from the tape and, consequently, could be carelessly lost.

U.S. Pat. No. 3,065,513, issued Nov. 27, 1962, discloses a separable link having two rods the opposite ends of which are connected by side plates, one of which rods is connected to the end of a strap 6 and the other of which rods is connected a strap 8 of parachute shroud lines. Such a link would not function as a stop for a restraint belt.

U.S. Pat. No. 4,041,580, issued Aug. 16, 1977, discloses a link connector similar to that disclosed in U.S. Pat. No. 3,065,513, which, like the connector of that patent, includes two spaced parallel rods having their corresponding ends connected by side plates. One of such rods is connected to parachute shrouds and the other of such rods is connected to a parachute riser strap. Such connector could not function as a restraint stop for the purpose of the present invention.

U.S. Pat. No. 3,696,474, issued Oct. 10, 1972, discloses a flexible lacing lock 18 through apertures in which a cord lacing 16 passes in sinuous fashion, but this lacing lock is not intended to be used for locking a flat strap and would be very bulky for use as a shoulder belt stop if it were effective at all.

SUMMARY OF THE INVENTION

It is an object of the present invention to provide a shoulder belt restraint having a stop that can relieve the usual tension of a shoulder belt effectively and reliably yet which can be adjusted along the length of the belt quickly and easily to accommodate user's of different size.

It is also an object to provide a stop for a shoulder belt restraint that is of simple and economical construction. Another object is to provide a shoulder belt restraint stop that can be adjusted readily lengthwise of the belt without being released from the belt and which will automatically be fixed in position on the belt by tensioning of the belt without manipulation by the user.

A further object is to provide a stop for a shoulder belt restraint which is compact, attractive in appearance and which will not cause damage to clothes or the person of the user.

Another object is to provide a shoulder belt restraint stop which can be applied quickly and easily to a shoulder belt restraint and which thereafter can be adjusted lengthwise of the belt as may be preferred without requiring any relative movement of the parts of the stop.

The foregoing objects can be accomplished by a stop composed of at least three, and preferably four, rods of equal thickness, that can be of cylindrical shape and are held in coplanar relationship with adjacent rods spaced apart a distance approximately equal to the thickness of a rod and held in such relationship by two side plates connecting opposite ends of the rods and spaced apart a distance slightly greater than the width of restraint webbing. Preferably one of the side plates can be removed from the rod ends by connecting them with tongue joints so that the stop can be readily applied to webbing by lengthwise movement of the rods transversely of the length of the webbing. The thickness of the webbing should be in the range of one-third to one-fifth of the thickness of the rods and the webbing should pass sinuously through the stop including at least two passes under one rod and over the next rod.

BRIEF DESCRIPTION OF THE DRAWINGS

FIG. 2 is a plan of the stop of the present invention with parts broken away.

FIG. 3 is a top perspective of the stop of the present invention shown in combination with a fragment of the shoulder belt restraint webbing.

FIGS. 4, 5 and 6 are sections through the stop taken along the line 4—4 of FIG. 2 showing the shoulder belt restraint webbing in different arrangements relative to the stop.

FIG. 7 is a top perspective similar to FIG. 3 but showing parts in exploded relationship.

FIG. 8 is an enlarged fragmentary detail of a rod end and side plate connection with parts broken away.

DETAILED DESCRIPTION

Figure 1:
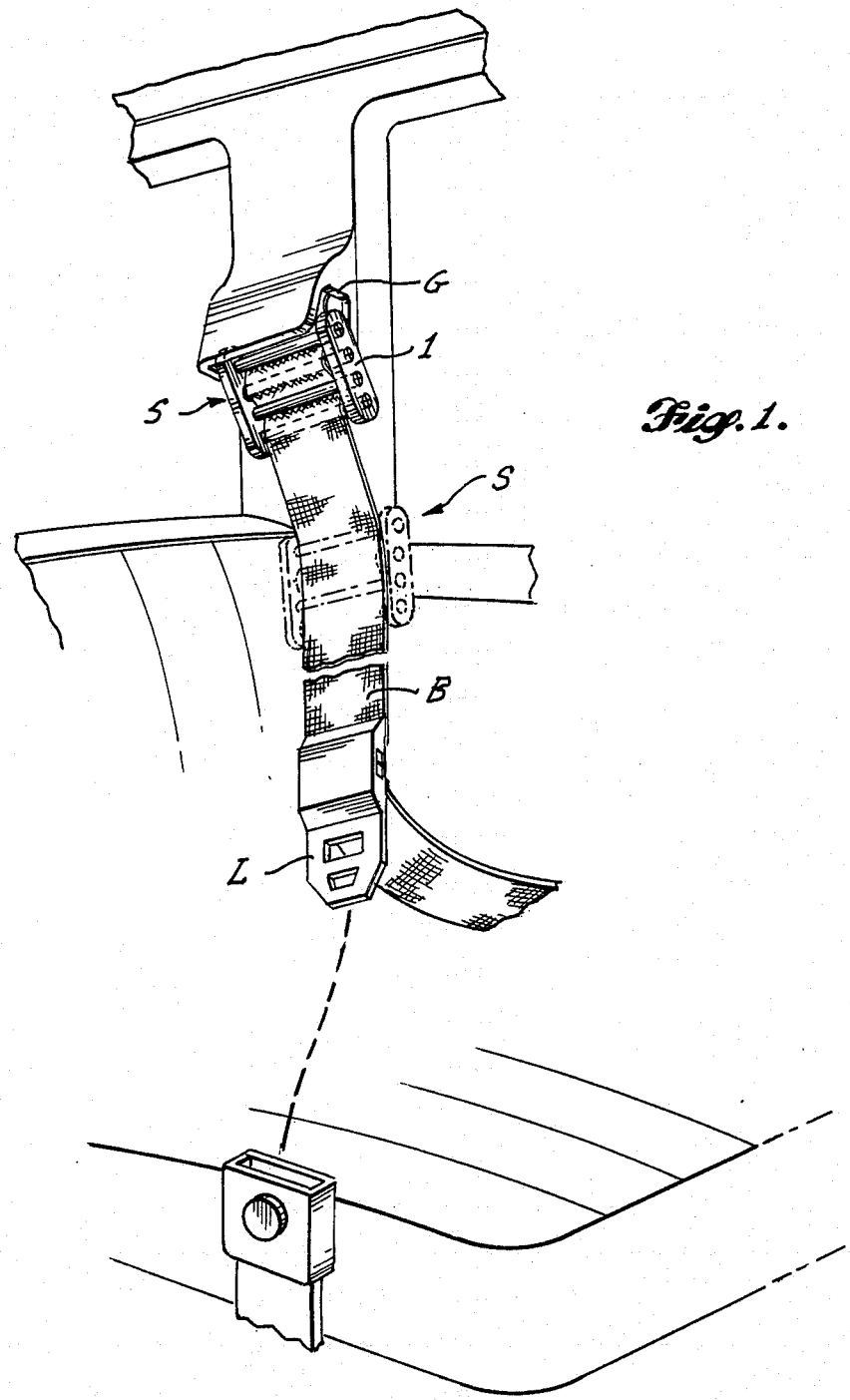
FIG. 1 is a perspective of a shoulder belt restraint and stop according to the present invention.

A customary type of shoulder belt restraint customarily used in automobiles for general use, but also appropriate for use in racing cars, racing boats and airplanes, includes a belt B usually of webbing that has a latch or buckle L on its lower end or along its lower length from which it passes upward through a guide loop G to spring tensioning mechanism. Such spring-tensioning mechanism automatically reels in the webbing upward through the guide loop G until a part of latch L engages the guide loop. In order to use the restraint for restraining a passenger, the passenger pulls the part of latch L attached to the webbing B downward in opposition to the tension of the spring and engages the parts of latch L. The webbing is then released and the spring means pulls the slack of the webbing upward through the guide loop G until the webbing is taut extending diagonally across the chest of the wearer. With the web in this position, the wearer may be uncomfortable or merely annoyed and may pull the webbing downward manually to relieve its tension. Utilization of a stop S which will engage the guide loop G just before the belt B is drawn taut across the chest of the user will avoid such annoyance or discomfort of the user.

Users are of different size and consequently it is frequently necessary to adjust the position of the stop S lengthwise of the webbing B in order to interrupt the tensioning of the webbing by engagement of the stop with the guide loop G just before the webbing is pulled taut across the chest of the user. To prevent the stop from being lost inadvertently, it is desirable for the stop to be adjustable lengthwise of the webbing quickly and easily without being removed or released from the webbing by relative movement of parts of the stop such, as by an opening or unlatching maneuver. The stop of the present invention can be adjusted lengthwise of the webbing B simply by relieving the spring tension on the webbing, loosening the stop on the webbing and then sliding the stop along the webbing in one direction or the other to the new desired location.

The stop includes parallel side plates 1 which are spaced apart by connecting rods 2 a distance slightly greater than the width of the web B as shown in FIG. 3. Preferably, the side plates 1 hold the rods 2 in coplanar relationship, as shown in FIGS. 4, 5 and 6, with such rods in registration lengthwise, as shown in FIGS. 2 and 3.

While the rods 2 can be formed integrally with one or both of the side plates 1, it is preferable to have the rods connected removably to at least one of the side plates. FIG. 7 shows the rods 2 projecting in cantilever fashion from one of the side plates 1 with the other side plate removed from the opposite ends of the rods. That figure, FIG. 2 and FIG. 8, show tongue joints for connecting rod ends with a side plate. The side plate is shown as having a row of bores 3 through it constituting sockets for rod tongues 4 that are shown as having split ends to enable them to be contracted somewhat for insertion into the sockets 3. The degree of penetration of the tongues into the sockets is limited by shoulders 5 encircling the root ends of the tongues 4 for abutting the adjacent side of the side plate 1, as shown in FIG. 8. Also, the opening of socket 3 adjacent to the rod 2 is shown as being constricted or necked in. As shown best in FIG. 8, the tongue can be bellied so that, as the tongue is forced into the socket, the split end of the tongue will be contracted to allow the bellied tongue to pass into the socket, whereupon the tongue will expand within the socket to pull the shoulder 5 quickly against the side of the side plate 1 with a snap fit.

For ease of manufacture and convenience in shipping, the rods 2 can be manufactured separate from the side plates 1. All of the side plates can be the same and all of the rods 2 can be the same. The stops can then be assembled simply by connecting the side plates with rods.

In order to assemble a stop on webbing B conveniently, one of the side plates can be removed as shown in FIG. 7 and the stop can be assembled on the webbing by lengthwise movement of the rods 2 transversely of the webbing B with the webbing in sinuous or zigzag conformation as shown in FIGS. 4, 5 and 6. In order to provide sufficient friction to prevent the tension of the spring means from sliding the stop along the webbing B, the webbing should have at least two convolutions under one rod and over the adjacent rod as shown in FIGS. 4, 5 and 6. More than two convolutions may be required depending upon the nature, size and spacing of the rods, the relative thickness of the webbing and the spacing between the rods, as well as the nature of the webbing. The smoother the webbing and the rods, the farther adjacent rods are spaced apart and the stronger the spring force, the greater is the number of convolutions that will be required to produce adequate friction to hold the stop in place on the webbing.

A convenient and practical construction of the stop utilizes rods 2 of smooth plastic and of cylindrical shape which rods are two to four times the thickness of the webbing, are disposed in coplanar relationship and are spaced apart a distance approximately equal to their thickness. At least three of such rods must be utilized in order for the web to have two convolutions passing under one rod and over the next adjacent rod. In FIG. 6, three rods are shown connected to a side plate with the webbing B extending in sinuous fashion under one rod, over the next rod and under the next rod. In the arrangement shown in FIG. 5, the web B again is woven through the rods in sinuous fashion with two convolutions under one rod and over the adjacent rod, but in that case four rods in a row are provided and the web bridges between corresponding sides of the two intermediate rods.

Greater friction will be provided between the webbing and the stop by the arrangement shown in FIG. 4 in which the webbing makes three convolutions under one rod and over the adjacent rod in an array of four rods.

Alternatively, the friction between the webbing and the stop can be increased by making the surface of one or more of the rods 2 rough, by making the rods of polygonal cross section instead of cylindrical, by decreasing the spacing between the rods, by making the rods thinner relative to the thickness of the web and/or by increasing the number of rods and the number of convolutions of the web under one rod and over the adjacent rod.

The construction of the stop can be selected to provide sufficient friction so that the stop cannot be moved along the webbing B by pull of the spring means without appreciably altering the ease by which the stop can be moved along the webbing. In order to free the stop from gripping engagement with the webbing sufficiently to enable the stop to be moved readily lengthwise of the webbing, it is only necessary to pull such slack in the webbing as to eliminate the close contact of the webbing convolutions with the rods 2. The webbing will then loop around the rods instead of bearing on them so that the webbing can be slid easily between the rods in shifting the stop along the webbing to a desired position to accommodate users of different size. When the webbing passing through the stop is pulled tight, the stop will again grip the webbing sufficiently tightly to prevent the spring means tensioning the web beyond the stop when the stop is in engagement with the guide ring G.

I claim:

1. A shoulder belt restraint stop comprising at least three rods of equal length and substantially equal thickness, and two parallel side plates, each of said side plates connecting corresponding ends of said rods for holding said rods in parallel coplanar relationship with their lengths in registration and spaced apart transversely of the length of said rods a distance approximately equal to the thickness of said rods, corresponding end of said rods being removably connected to one of said side plates by tongue joints, each of which joints includes a tongue and socket.

2. The stop defined in claim 1, in which the end of the tongue of a tongue joint is split.

3. The stop defined in claim 2, in which the split tongue is bellied.

4. The stop defined in claim 3, in which the mouth of the tongue joint socket for receiving the bellied split tongue is constricted to effect a snap fit between the rod tongue and socket.

* * * * *

UNITED STATES PATENT AND TRADEMARK OFFICE
CERTIFICATE OF CORRECTION

PATENT NO. : 4,810,036
DATED : March 7, 1989
INVENTOR(S) : Warren H. Buser

It is certified that error appears in the above-identified patent and that said Letters Patent is hereby corrected as shown below:

ON THE TITLE PAGE:

Section [76] : the inventor's address is:

SR 4103
Keaau, Hawaii 96749

Signed and Sealed this

First Day of August, 1989

Attest:

DONALD J. QUIGG

Attesting Officer

Commissioner of Patents and Trademarks